United States Patent [19]

Milliken

[11] Patent Number: 5,154,442

[45] Date of Patent: Oct. 13, 1992

[54] SELF-CONTAINED ACCELERATION-RESPONSIVE ADAPTIVE DAMPER

[76] Inventor: Douglas L. Milliken, 245 Brompton Rd., Buffalo, N.Y. 14221

[21] Appl. No.: 615,346

[22] Filed: Nov. 19, 1990

[51] Int. Cl.$^5$ .............................................. B60G 11/26
[52] U.S. Cl. .................................. 280/702; 280/709; 137/45; 188/299
[58] Field of Search .................... 280/698, 702, 709; 180/282; 137/45; 188/275, 299, 322.15

[56] References Cited

U.S. PATENT DOCUMENTS

| | | | |
|---|---|---|---|
| 2,499,793 | 3/1950 | Stearns | 137/45 |
| 4,145,073 | 3/1979 | McLuckie et al. | 280/702 |
| 4,469,116 | 9/1984 | Hansen | 137/45 |
| 4,469,117 | 9/1984 | Hansen | 137/45 |
| 4,478,431 | 10/1984 | Muller et al. | 280/710 |
| 4,586,728 | 5/1986 | Tohusaga | 280/707 |
| 4,589,676 | 5/1986 | Meloche et al. | 280/707 |
| 4,591,186 | 5/1986 | Ashlba | 280/707 |
| 4,647,069 | 3/1987 | Iijima | 280/707 |
| 4,671,534 | 6/1987 | Yano | 280/707 |
| 4,720,084 | 1/1988 | Hollerweger et al. | 267/217 |

FOREIGN PATENT DOCUMENTS

| | | |
|---|---|---|
| 0224815 | 6/1987 | European Pat. Off. . |
| 56621 | 4/1985 | Japan .................. 280/698 |
| 852845 | 11/1960 | United Kingdom ........ 280/702 |

Primary Examiner—Charles A. Marmor
Assistant Examiner—Tamara L. Graysay
Attorney, Agent, or Firm—D. Jacobs

[57] ABSTRACT

A damper for a vehicle suspension utilizes accelerometer elements for controlling damping rate in response to lateral or longitudinal ("horizontal") acceleration of the vehicle. The accelerometer can be a mass/spring assembly within the damper housing. The accelerometer is linked to at least one damping rate adjuster element, such as a variable orifice or pop-off valve, so that increasing displacement of the accelerometer, in response to increasing vehicle horizontal acceleration, varies the setting of the rate-controlling elements to modify the damping rate. The horizontal acceleration/damping curve can be "tuned," and can be varied in X and Y axes, by selecting various accelerometer weights and springs, or by utilizing multiple accelerometers.

15 Claims, 6 Drawing Sheets

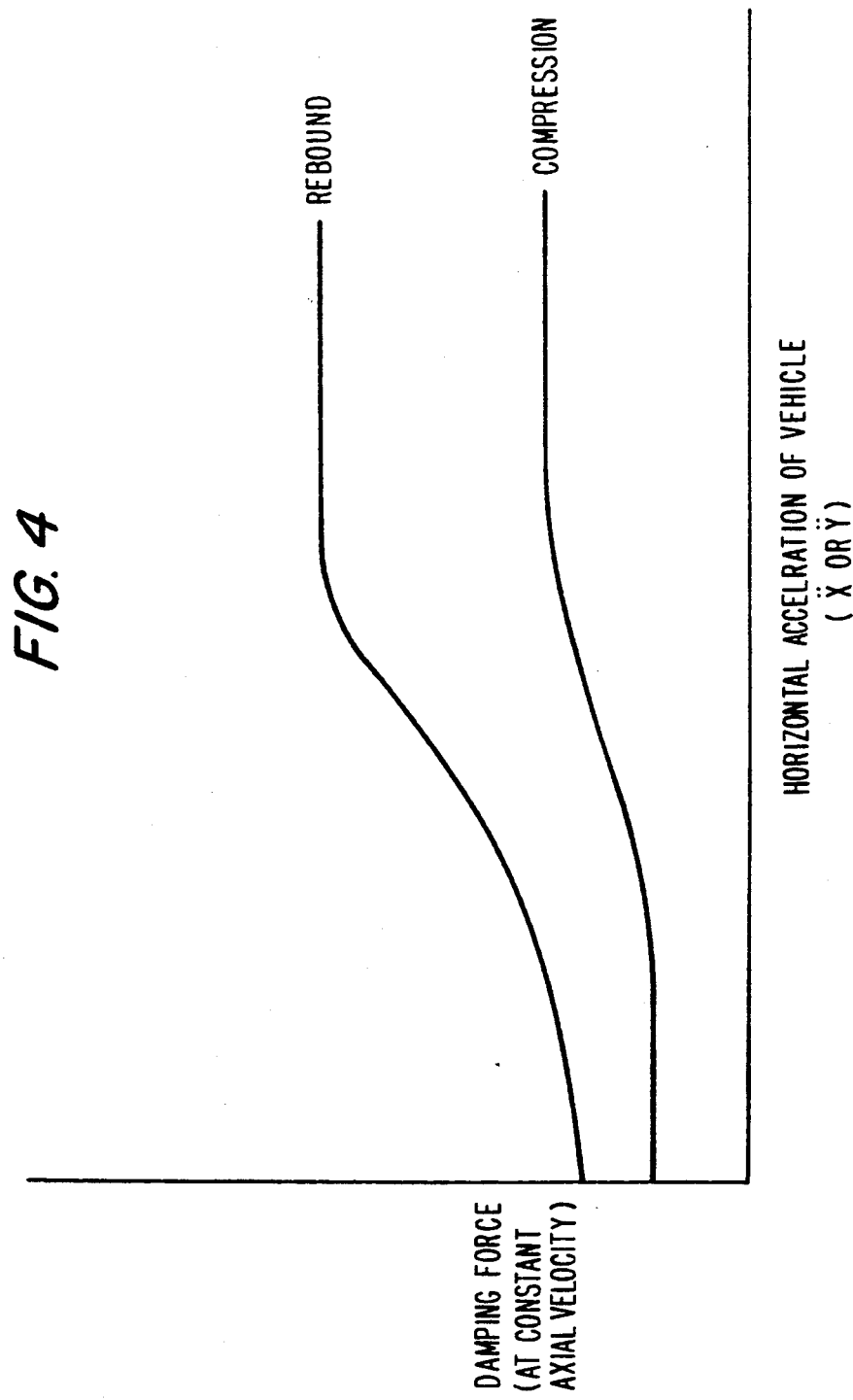

SELF-CONTAINED ACCELERATION-RESPONSIVE ADAPTIVE DAMPER

BACKGROUND OF THE INVENTION

This invention relates generally to vehicle suspension systems, and, more particularly, relates to vehicle shock absorbers or dampers that provide variable damping in response to changes in vehicle movement.

The basic components of conventional dampers are a piston and piston rod operating inside a fluid filled cylinder, fitted with suitable piston seals and piston rod seals. Various orifices are provided either in the piston or in the cylinder to adjust the resistance of the damper to relative axial movement between the piston rod and the cylinder. The ends of the piston rod and cylinder are provided with fittings for attaching the damper between the sprung mass (body) of the vehicle and the unsprung mass (wheel and suspension components) of the vehicle.

Several configurations of dampers are currently in use, some of which use compressible gas under pressure, with or without an additional piston or external reservoir, to allow for the varying volume inside of the unit as the rod moves in and out of the cylinder. Other types use an un-pressurized reservoir to store the excess fluid when the rod enters the cylinder. Still other configurations, no longer in wide use, employ a lever that operates the damping element.

Damping characteristics of conventional shock absorbers are a compromise between the requirements of acceptable ride comfort and the reqirements for good handling. In order to provide a smooth ride, the force passed to the body from the wheel by the damper when traversing a bump should be low. For handling, the shock absorber must firmly damp the rolling and pitching of the body with lateral and longitudinal accelerations. The ride/handling compromise occurs because hydraulic dampers are sensitive to piston/cylinder velocity, and the velocity of the piston relative to the cylinder is similar for certain bump conditions and roll/pitch conditions. Damping roll and pitch with sufficient firmness to provide good handling thus imposes a damping rate that is excessive for smooth ride.

Typical shock absorbers address this problem by partially linearizing force/velocity characteristics. This approach, which recognizes that orifices pass fluid in proportion to the square-root of the pressure across them, utilizes multiple metering orifices. A small bleed orifice is used to pass fluid at low velocities, and other orifices are opened by pressure regulating mechanisms (blow-off or pop-off valves) to reduce the damping force at higher velocities. Other valve and orifice configurations are also used to vary the characteristics as a function of velocity.

Some dampers are also sensitive to the axial position of the piston, such that the damping action is soft near the center (small ride motions) and stiffer near the ends. Shock absorbers of this type are referred to as "stroke-sensitive."

In recent years many electronic or electrically variable shock absorbers have been introduced. These devices allow the shock absorber force/velocity characteristics to be varied as a function of driver choice or other sensed variables, including steering wheel angle, brake application (typically on motorcycles), laterally or longitudinally mounted accelerometers, or other sensing devices. These dampers often utilize a microprocessor or other computing device. The variability offered by these dampers reduces the ride/handling compromise. Such dampers are referred to as adaptive suspension components.

Examples of variable damping systems are disclosed in the following patents:
U.S. Pat. No. 4,478,431
U.S. Pat. No. 4,586,728
U.S. Pat. No. 4,589,676
U.S. Pat. No. 4,591,186
U.S. Pat. No. 4,647,069
U.S. Pat. No. 4,671,534
U.S. Pat. No. 4,720,084
EPO 224,815
EPO 238,977.

U.S. Pat. No. 4,478,431 discloses a vehicle suspension having load-dependent damping. The hydraulic dampers include a pressure-responsive spring-loaded valve controlling a metering orifice. Damping rate increases with increasing hydraulic pressure, which depends on the laden weight of the vehicle.

U.S. Pat. No. 4,586,728 discloses an adjustable suspension system in which sensors detect vehicle speed and engine power output. Above a pre-set acceleration rate, a control circuit transmits signals to increase the damping rate of the shock absorbers.

U.S. Pat. No. 4,589,676 discloses an adaptive ride-control system in which adjustable hydraulic dampers are regulated by a control circuit in response to the amplitude of vertical oscillation of the wheels.

U.S. Pat. No. 4,591,186 discloses an adjustable damper in which an external automatic controller, responsive to brake fluid pressure, vehicle speed and steering wheel angle, selects between high and low shock absorber damping rates.

U.S. Pat. No. 4,647,069 discloses an adjustable suspension system having coordinated ride-height control and adjustable damping. A ride-height sensor transmits electrical signals to a controller that directs an electrical actuator to provide an inverse relationship between damping force and ride height.

U.S. Pat. No. 4,671,534 discloses a suspension system that increases damping rates in response to vehicle speed and sensed lateral forces. A control unit calculates lateral acceleration based on signals from a speed sensor and pressure sensors on the left and right sides of the vehicle.

U.S. Pat. No. 4,720,084 discloses a hydraulically damped engine mount. The mount includes two chambers separated by a control valve. Operation of the control valve is controlled in part by an inertial damping mass coupled to the control valve by a variable hydraulic clamp circuit. The control pressure of the clamp circuit can be varied to provide various damping characteristics.

EPO Patent No. 224,815 discloses an adjustable hydraulic damper having flow-controlling ducts that are opened or closed by solenoid elements.

EPO Patent No. 238,977 discloses a suspension system having a variable shock absorber. The effective stroke and damping rate of the shock absorber are varied by an external adjuster, whose setting is regulated by an external controller in response to vehicle and road conditions.

Conventional electronic or electrically variable shock absorbers, however, are expensive, difficult to manufacture, and often require re-design of other existing suspension or body components to provide support and clearance. Typical electronically-variable dampers also require external sources of power (electrical, mechanical, hydraulic, or other) and the use of microprocessors, which increase complexity and reduce reliability.

It is accordingly an object of the invention to provide improved variable damping apparatus.

Another object of the invention is to provide damping apparatus that dynamically varies damping rates in response to lateral or longitudinal—i.e., horizontal—acceleration of the vehicle.

It is a further object of the invention to provide adaptive damping apparatus that is self-contained and operates without external sources of electrical power.

Another object of the invention is to provide adaptive dampers that are reliable, easily manufactured, and readily adaptable to existing suspension systems.

Other general and specific objects of the invention will in part be obvious and will in part appear hereinafter.

SUMMARY OF THE INVENTION

The foregoing objects are attained by the invention, which provides a vehicle suspension damper having acceleration-responsive damping control. The damper includes hydraulic damping elements that provide damping force in response to relative movement between a vehicle wheel and a vehicle body element. A damping rate controller coupled to the damping elements controls damping force amplitude in at least one direction of movement between the vehicle wheel and the vehicle body element. The damper can utilize first and second damping rate controllers, the first controlling damping force in compression, and the second controlling damping force in rebound.

In one aspect of the invention, the damping rate controller includes adjuster elements having at least first and second selectable settings. Rate controlling elements vary the damping force in response to the setting of the adjuster elements. An accelerometer unit coupled to the adjuster elements responds to horizontal acceleration of the vehicle by controlling the setting of the adjuster elements. Accordingly, the selected setting of the adjuster elements is responsive to horizontal acceleration of the vehicle, so that the damping force amplitude is responsive to horizontal acceleration of the vehicle.

The accelerometer unit includes movable mass elements, coupled ti the adjuster elements, for displacement through a selected range in response to the horizontal acceleration of the vehicle. Accelerometer damping elements can be provided for damping movement of the mass elements. The accelerometer damping elements can provide a first rate of accelerometer damping for displacement of the movable mass elements away from the center position, and a second level of accelerometer damping for return of the movable mass elements to the center position. The first rate of accelerometer damping is lower than the second rate of accelerometer damping, to provide a rapid increase in damping force amplitude upon increased horizontal vehicle acceleration, and a slower return to lower damping force amplitude upon reduced horizontal vehicle acceleration.

The accelerometer unit also contains centering elements, coupled to the movable mass elements, for applying to the movable mass elements a centering force tending to return the movable mass elements to a selected center position. Displacement of the movable mass elements from the selected center position in response to a given acceleration of the vehicle is thus controlled by the centering force, so that the selected setting of the adjuster elements, and the damping force amplitude, are also controlled by the centering force. Center force adjusters can be used to vary the centering force.

In one aspect of the invention, the center position of the mass elements corresponds to a first setting of the adjuster elements, so that the centering force acts to return the adjuster elements to the first setting. The first setting provides relatively low damping force amplitude. The accelerometer elements are coupled to the adjuster elements such that the accelerometer responds to high horizontal vehicle acceleration by selecting a second, high damping setting, and responds to low horizontal vehicle acceleration by selecting the first setting of the adjuster elements. This configuration provides relatively high damping force amplitude in response to high horizontal vehicle acceleration, and relatively low damping force amplitude in response to low horizontal vehicle acceleration.

The accelerometer elements can include elements for constraining the movable mass to move in a predetermined path in response to horizontal acceleration of the vehicle. These constraining elements can be pivot elements, coupled to the movable mass elements, for constraining the movable mass elements to pivot about a substantially vertical axis in response to horizontal acceleration of the vehicle.

The accelerometer unit can be adapted for location within the housing of the damper, to provide a self-contained damping unit. More particularly, the accelerometer unit can be adapted for location within or adjacent to the hydraulic damping elements.

In a further aspect of the invention, the movable mass module includes at least first and second mass elements. The first mass element is adapted for movement in response to accelerations along a first axis, while the second mass element is adapted for movement in response to acceleration along a second axis substantially orthogonal to the first axis.

The adjuster elements can operate in an analog or digital fashion. Specifically, the adjusters can have discretely selectable settings, each providing a different selectable damping force amplitude. Alternatively, the adjuster elements can have a continuous range of selectable settings, for providing a continuous range of selectable damping force amplitudes. In either case, the accelerometer is coupled to the adjusters to select the setting of the adjusters from the discrete or continuous range of selectable settings, in response to changes in horizontal vehicle acceleration.

The adjuster elements can be elements for adjusting the area of a flow-restricting orifice, or elements for adjusting preload force on a flow-controlling valve.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and the accompanying drawings, in which:

FIG. 4 is a simplified graph depicting the acceleration/damping force characteristics of a damper constructed in accord with the invention;

DESCRIPTION OF ILLUSTRATED EMBODIMENTS

Figure 1:
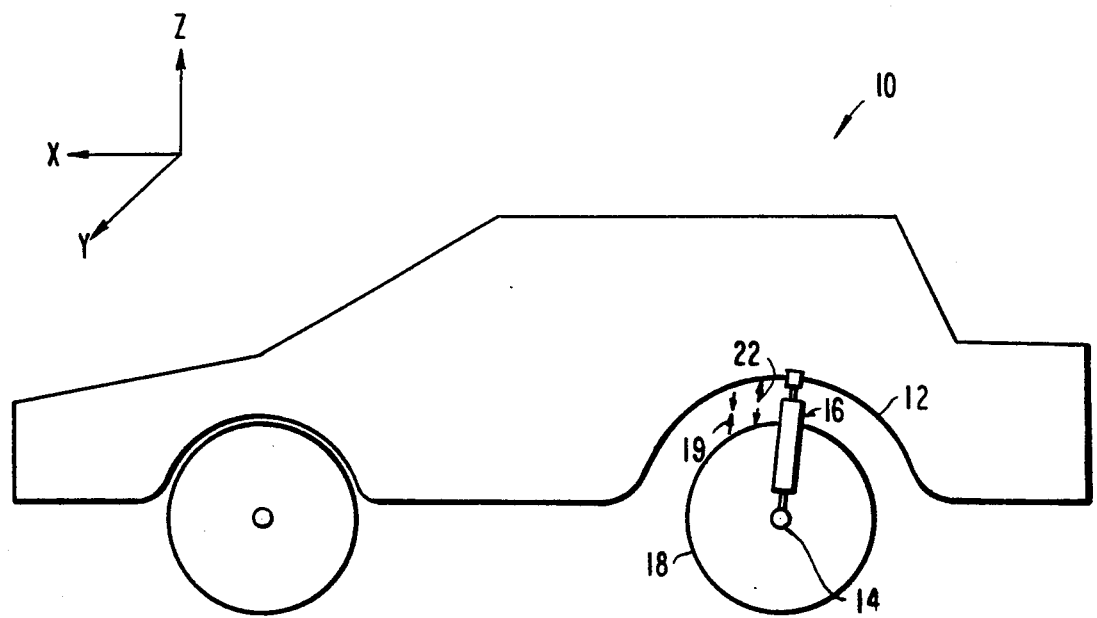
FIG. 1 is a schematic diagram depicting vehicle accelerations and suspension components.

FIG. 1 is a schematic diagram depicting components of a vehicle 10 utilizing a self-contained, acceleration-responsive adaptive damper 16 constructed in accordance with the invention. In the embodiment shown in FIG. 1, damper 16 is disposed between frame or body element 12 and the axle 14, which carries wheel 18. The damper 16 provides damping force or resistance to relative movement between the wheel 18 and the body element 12. This movement includes compression or jounce 19 and rebound 22.

The damping characteristics of the damper 16 change in response to accelerations of the vehicle 10 along the X and Y axes indicated in FIG. 1—i.e., longitudinal or lateral accelerations, collectively referred to herein as horizontal accelerations.

Figure 2:
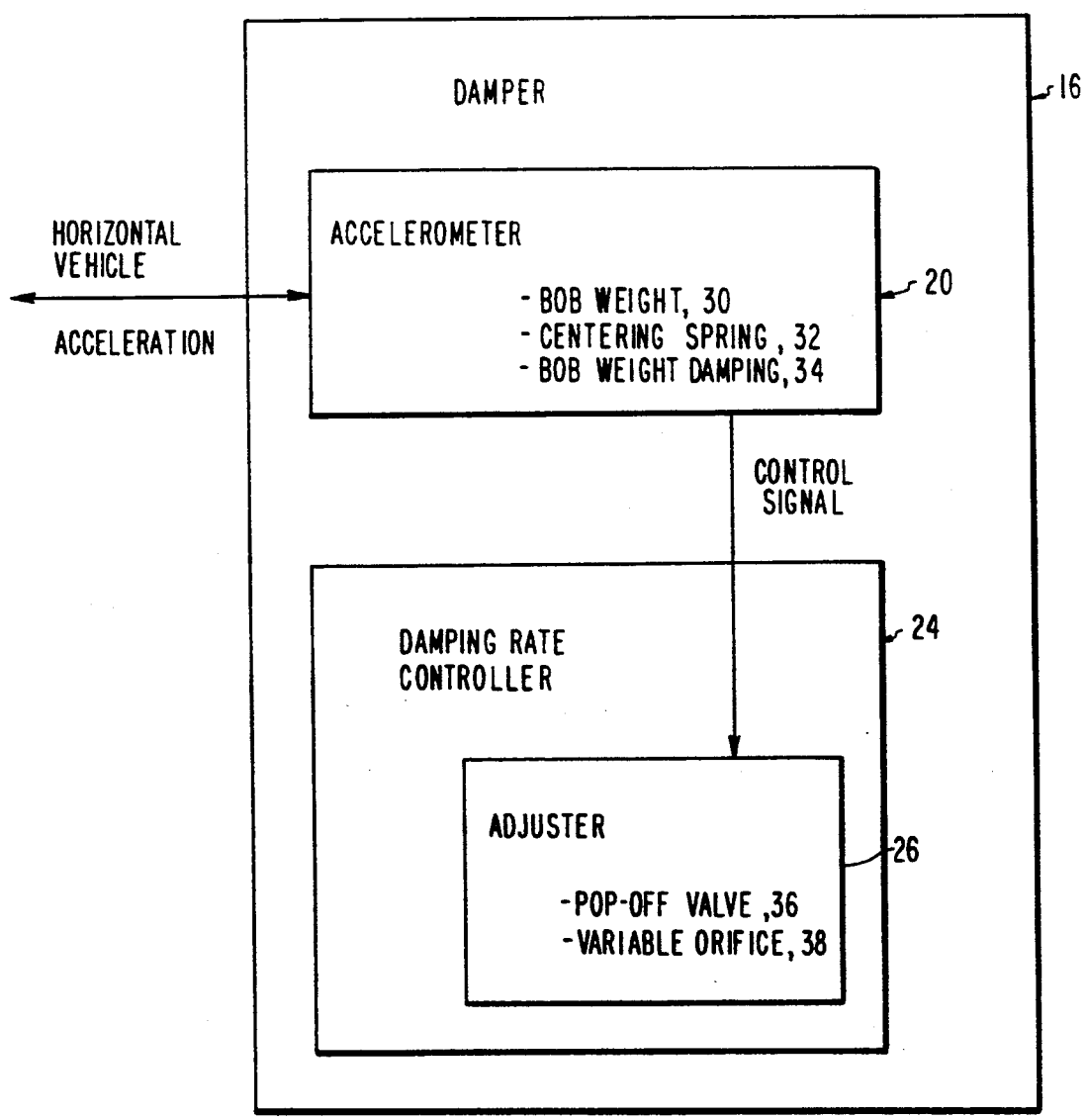
FIG. 2 is a block diagram showing the components of a self-contained acceleration-responsive adaptive damper constructed in accordance with the invention.

This acceleration-responsive variation is attained by utilizing the control configuration shown in FIG. 2. As indicated therein, damper 16 incorporates an accelerometer module 20 responsive to horizontal vehicle acceleration, and a damping rate controller 24 responsive to control signals generated by the accelerometer 20. The accelerometer can include a movable mass or bob weight 30, a mass centering spring 32, and an accelerometer mass damping element 34, discussed below. The damping rate controller 24 contains an adjuster module 26 that can include a damping control elements such as valves 36 and 37 or variable orifice 38 controlled by the control signal from accelerometer 20.

Figure 3:
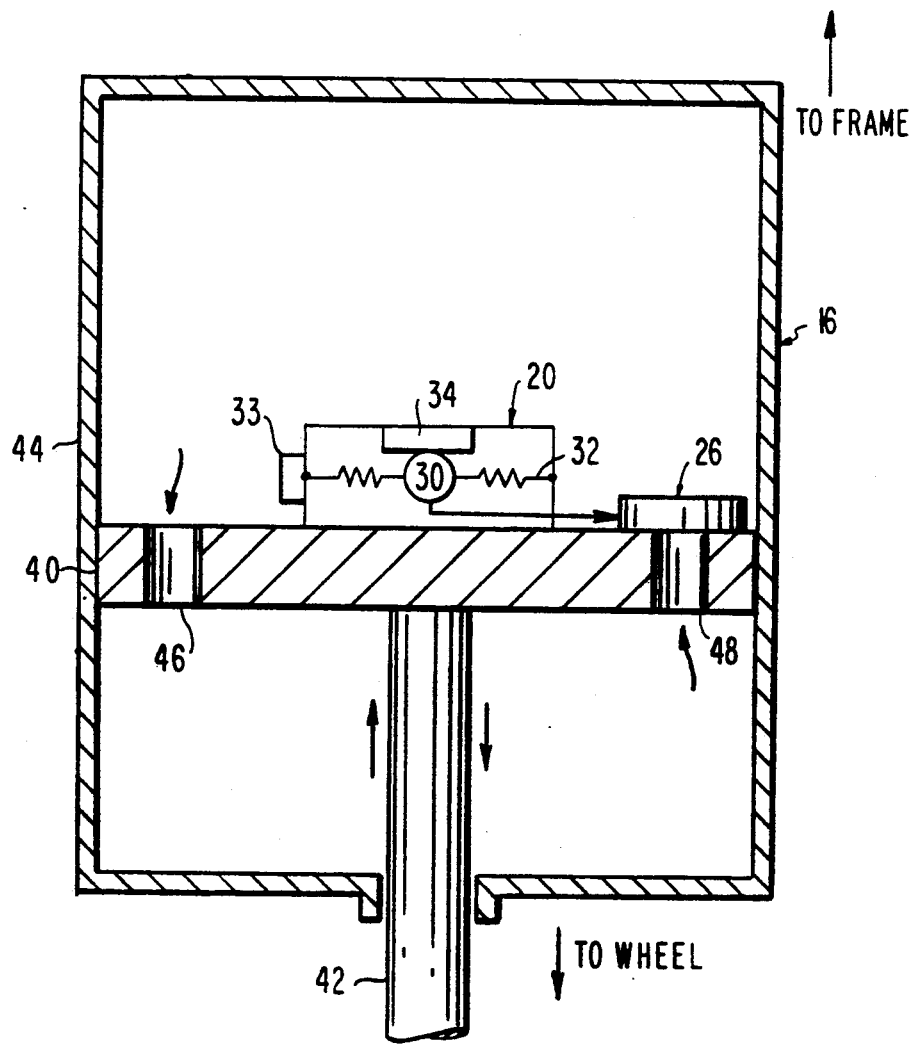
FIG. 3 is a schematic diagram depicting accelerometer and damping rate controller elements in one embodiment of the invention.

An implementation of this control architecture is depicted in FIG. 3. Damper 16 shown therein includes a housing 44 having a fluid-containing cylindrical bore in which piston 40 and rod 42 reciprocate. Piston 40 has orifices 46 and 48 for controlled passage of hydraulic fluid. Orifice 48 is controlled by adjusting element 26, which can be a conventional controllable pop-off valve or variable-orifice element constructed in accord with known practice. Orifice 46 can be similarly controlled by another adjusting element.

The adjuster 26 has at least two settings, corresponding to low damping rate and high damping rate. These settings are selectable by application of deflection or other mechanical control signal by accelerometer 20. The setting of adjuster 26, and thus the damping rate of the damper 16, is thereby controlled by the mechanical signals from accelerometer 20, which is fitted to the piston 40. The accelerometer 20 can be constructed in accordance with known accelerometer practice, and includes a mass 30 (also referred to as a bob weight) and a centering mechanism, typically a spring 32, which generates a centering force tending to return the mass 30 to a center position. The accelerometer can also incorporate a damping element 34 to damp the motion of the bob weight.

In operation, the damper 16 exploits the fact that shock absorbers are typically mounted with their long axis at a nearly constant, substantially vertical attitude. When the vehicle is under high horizontal acceleration, horizontal movement of the accelerometer mass 30 varies the shock absorber characteristics by deflecting the position of, or controlling the setting of, a conventional adjuster 26—more particularly, by varying the size of an orifice, closing and opening an orifice, varying the preload on a pop-off valve spring, or by otherwise conventionally changing the hydraulic damping characteristics of the shock absorber. When the vehicle returns to a generally low horizontal acceleration condition, the spring 32 or other centering device returns the mass to its center position, causing the adjuster to return to the position corresponding to low damping rate and returning the damper to its soft setting.

General aspects of this behavior are depicted in FIG. 4, which is a simplified graph showing the relationship between horizontal accelerations of the vehicle and damping force for rebound and compression at a given axial velocity. As indicated in FIG. 4, the damping characteristics of damper 16 can be generally soft (low resistance to deflection) under low lateral or longitudinal acceleration, as when the vehicle 10 is traveling in a straight line with little or no forward acceleration or braking. When the vehicle is turned, accelerated in a forward direction, or braked, the damper reacts by damping more firmly.

The curves depicted in FIG. 4 are provided by way of example, and FIG. 4 illustrates only one set of operational characteristics for a damper 16 operating at constant axial velocity. Those skilled in the art will appreciate that other acceleration/damping characteristics can be selected. The acceleration/damping relationship can be substantially linear, as indicated in FIG. 4, or can comprise a set of discrete damping force levels. Additionally, the acceleration-responsive action of damper 16 can be implemented in combination with any of the conventional methods described above for modifying damping characteristics with axial velocity or stroke.

Moreover, the characteristics of the shock absorber can be varied in an analog sense, proportional to the horizontal acceleration, as depicted in FIG. 4; or in a "digital" sense, by switching between two or more discrete settings with small changes in horizontal acceleration.

The damping mechanism fitted to the accelerometer mass can also be used to modify the time history of the change in damping characteristics. For example, the damping element in one embodiment of the invention permits rapid movement of the accelerometer mass off-center and slower return to the on-center position, to permit rapid transition to the stiff or "sport handling" setting and a slower return to the soft or "ride" setting.

Figure 5A:
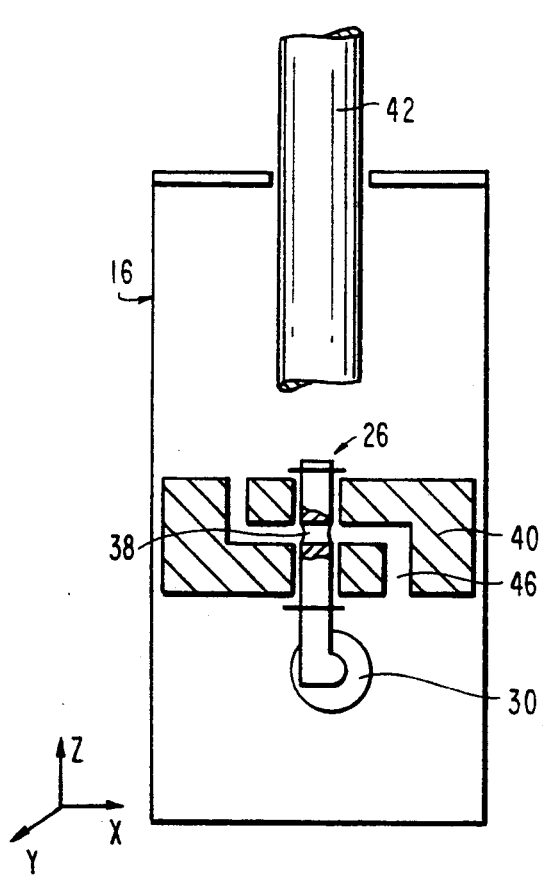
FIGS. 5A, 5B, and 5C are three views showing an accelerometer/valve assembly utilizing a horizontally pivotable mass.
Figure 5B:
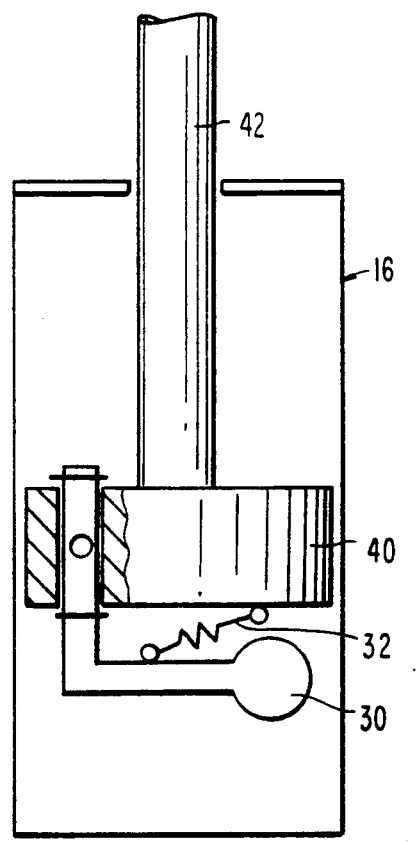
Figure 5C:
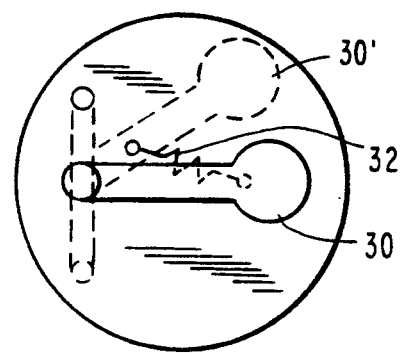
Figure 6A:
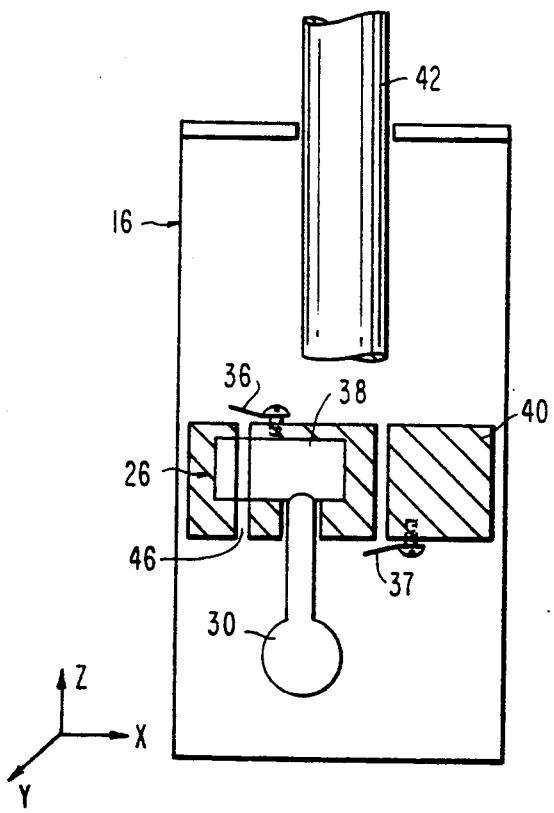
FIGS. 6A, 6B, and 6C are three views showing an accelerometer/valve assembly utilizing a pendant mass.
Figure 6B:
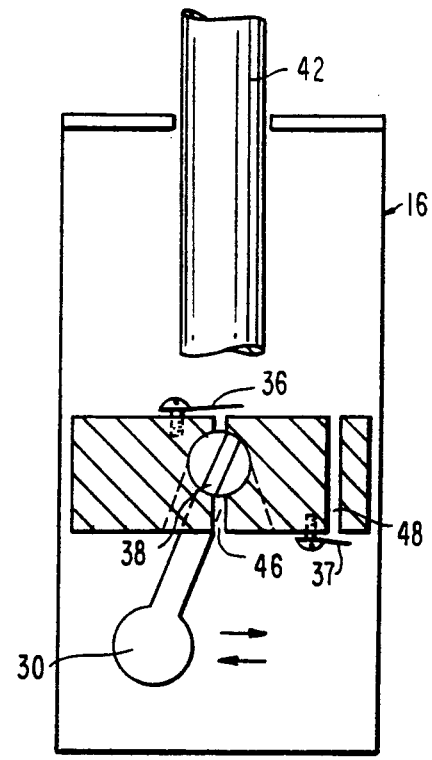
Figure 6C:
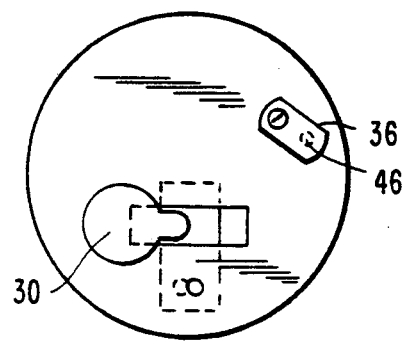

FIGS. 5A–6C show detail of other accelerometer/valve configurations constructed in accord with the invention. Specifically, FIGS. 5A, 5B, and 5C are three views depicting an accelerometer/valve assembly utilizing a horizontally pivotable mass, and FIGS. 6A, 6B, and 6C are three views showing an accelerometer/valve assembly utilizing a pendant mass.

The horizontally pivotable mass depicted in FIGS. 5A-5C is coupled to a valve fitted in a valve bore. Pivoting movement of the mass and valve varies the effective flow area of the valve assembly. A by-pass valve can also be employed for operation when the controlled valve is fully closed. The valve assembly shown in FIGS. 5A-5C can be retained by substantially circular clips known as circlips.

The pendant mass/valve assembly of FIGS. 6A-6C is shown controlling the jounce damping setting of the damper. This assembly requires no centering spring. Instead, the mass is gravitationally centered. Deflected disc valve elements can be employed, as indicated in FIG. 6B, wherein the movable mass is interconnected to deflect the disc upon horizontal acceleration.

In each case, the accelerometer mass is constrained to move on a path or in a direction that is approximately horizontal, either laterally, longitudinally or both. As indicated in FIGS. 5A-6C, the weight can be pivoted to swing about an arc or guided to move in a straight line or any other desirable path. A pivotable mass is preferred for some applications, as it provides a low friction means of constraining the deflection of the movable mass element to the desired horizontal path.

Those skilled in the art will appreciate that various pop-off valves, deflected disc valves or reed valves, or other conventional valve structures can be employed as variants of the illustrated structures.

The accelerometer can also utilize multiple masses. In this embodiment of the invention, a first mass element is adapted for movement in response to accelerations along a first axis, while a second mass element is adapted for movement in response to acceleration along a second axis substantially orthogonal to the first axis. The weights can be fitted in either the piston and piston-rod assembly or in the cylinder assembly. In many applications, the weights are best fitted at the end of the damper that is attached to the vehicle, to reduce vertical accelerations experienced by the accelerometers.

A single accelerometer can be employed to vary the characteristics of more than one orifice, pop-off valve, or other adjusting element. If multiple accelerometer masses are utilized, damper characteristics can be tuned to vary differently with accelerations in different directions.

In another embodiment of the invention, several bob weight accelerometers are used and the various stages of the shock absorber orifices and valving are varied separately in response to horizontal accelerations in different directions. Thus, for example, when the vehicle turns, the inside wheel could be automatically adjusted to a different setting than the outside wheel. Bump and rebound settings, corresponding to compression and extension of the damper, could also be separately controlled.

It will thus be seen that the invention efficiently attains the objects set forth above, among those made apparent from the preceding description. In particular, the invention provides self-contained damping apparatus that dynamically varies damping rates in response to horizontal acceleration of the vehicle. Dampers constructed in accordance with the invention operate without external sources of electrical power, and are reliable, easily manufactured, and readily adaptable to existing suspension systems. Moreover, because such dampers do not require extra wiring, sensors or computing elements, their cost should be less than that of electronic or electrically controlled shock absorbers. The invention accordingly achieves many of the benefits of electronic or electrically controlled dampers, at a significantly lower installed cost.

It will be understood that changes may be made in the above construction and in the foregoing sequences of operation without departing from the scope of the invention. For example, the invention can be practiced in connection with hydraulic valve elements other than those depicted in the drawing figures. The invention can also utilize self-contained electronic accelerometers and elements for generating electrical power from movement of the shock rod.

It is accordingly intended that all matter contained in the above description or shown in the accompanying drawings be interpreted as illustrative rather than in a limiting sense. It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. In a vehicle suspension damper including hydraulic damping elements contained within a housing for providing damping force in response to relative movement between a vehicle wheel and a vehicle body element, acceleration-responsive damping control apparatus comprising damping rate controlling means, coupled to said damping elements, for controlling damping force amplitude in at least one direction of movement between the vehicle wheel and the vehicle body element, said rate controlling means including adjuster means having at least a first selectable setting and a second selectable setting, said rate controlling means being responsive to the selected setting of said adjuster means to vary said damping force amplitude in said at least one direction of movement in accordance with the selected setting of said adjuster means, and accelerometer means, located within said housing and coupled to said adjuster means, for sensing horizontal acceleration of the vehicle and for responding to said acceleration by controlling the setting of said adjuster means, so that the selected setting of said adjuster means is responsive to horizontal acceleration of said vehicle, whereby said damping force amplitude in at least one direction of movement is responsive to horizontal acceleration of the vehicle.

2. Apparatus according to claim 1, wherein said accelerometer means comprises movable mass means, coupled to said adjuster means, for displacement through a selected range in response to the horizontal acceleration of the vehicle, and centering means, coupled to said movable mass means, for applying to said movable mass means a centering force tending to return said movable mass means to a selected center position, so that displacement of said movable mass means from said selected center position in response to a given acceleration of the vehicle is controlled by said centering force, whereby the selected setting of said adjuster means, and the damping force amplitude, are also controlled by said centering force.

3. Apparatus according to claim 2, wherein said centering means includes centering force adjustment means for varying said centering force.

4. Apparatus according to claim 2, wherein said accelerometer means further comprises accelerometer-damping means, coupled to said movable mass means, for damping movement of said movable mass means.

5. Apparatus according to claim 4, wherein said accelerometer damping means provides a first rate of accelerometer damping for displacement of said movable mass means away from said center position, and a second level of accelerometer damping for return of said movable mass means to the center position.

6. Apparatus according to claim 5 wherein the first rate of accelerometer damping is lower than said second rate of accelerometer damping, to provide a rapid increase in damping force amplitude upon increased horizontal vehicle acceleration, and a slower return to lower damping force amplitude upon reduced horizontal vehicle acceleration.

7. Apparatus according to claim 2, wherein said selected center position corresponds to the first selected setting of said adjuster means, so that said centering force acts to return the adjuster means to said first setting.

8. Apparatus according to claim 7, wherein
said first setting of said adjuster means provides relatively low damping force amplitude,
said second setting of said adjuster means provides relatively high damping force amplitude, and
said accelerometer means is coupled to said adjuster means such that said accelerometer means responds to high horizontal vehicle acceleration by selecting said second setting of said adjuster means, and responds to low horizontal vehicle acceleration by selecting said first setting of said adjuster means, to provide relatively high damping force amplitude in response to high horizontal vehicle acceleration, and relatively low damping force amplitude in response to low horizontal vehicle acceleration.

9. Apparatus according to claim 2 wherein said accelerometer means comprises constraining means, coupled to said movable mass means, for constraining said movable mass to move in a predetermined path in response to horizontal acceleration of the vehicle.

10. Apparatus according to claim 9 wherein said constraining means includes pivot means, coupled to said movable mass means, for constraining said movable mass means to pivot about a substantially vertical axis in response to horizontal acceleration of the vehicle.

11. Apparatus according to claim 2 wherein the accelerometer means is adapted for location substantially adjacent to the hydraulic damping elements.

12. Apparatus according to claim 1, wherein said damping-ratecontrolling means further comprises
first and second damping control elements,
said first damping control element being adapted for controlling damping force amplitude in compression movement between the vehicle wheel and the vehicle body element and
said second damping control element being adapted for controlling damping force amplitude in rebound movement between the vehicle wheel and the vehicle body element.

13. Apparatus according to claim 1 wherein
said adjuster means has a plurality of discretely selectable settings, each providing a different selectable damping force amplitude, and
said accelerometer means is coupled to said adjuster means to select the setting of said adjuster means, among said plurality of discrete settings, in response to changes in horizontal vehicle acceleration.

14. Apparatus according to claim 1 wherein
said adjuster means has a continuous range of selectable settings, for providing a continuous range of selectable damping force amplitudes, and
said accelerometer means is coupled to said adjuster means to select the setting of said adjuster means from said continuous range of selectable settings, in response to changes in horizontal vehicle acceleration, to provide damping force amplitudes substantially proportional to horizontal vehicle acceleration.

15. Apparatus according to claim 1 wherein said adjuster means includes means for adjusting the area of a flow-restricting orifice.

* * * * *